United States Patent
Takeuchi

(10) Patent No.: US 8,265,578 B2
(45) Date of Patent: Sep. 11, 2012

(54) RADIO RECEIVING APPARATUS

(75) Inventor: Takashi Takeuchi, Hachiouji (JP)

(73) Assignee: Kabushiki Kaisha Kenwood, Tokyo-To (JP)

(\*) Notice: Subject to any disclaimer, the term of this patent is extended or adjusted under 35 U.S.C. 154(b) by 118 days.

(21) Appl. No.: 12/928,824

(22) Filed: Dec. 21, 2010

(65) Prior Publication Data

US 2011/0151814 A1    Jun. 23, 2011

(30) Foreign Application Priority Data

Dec. 22, 2009    (JP) ................. 2009-291157

(51) Int. Cl.
*H04B 1/10* (2006.01)
*H04K 3/00* (2006.01)
(52) U.S. Cl. .................. 455/218; 455/212
(58) Field of Classification Search .......... 455/212, 455/213, 218, 222, 223, 224; 381/13
See application file for complete search history.

(56) References Cited

U.S. PATENT DOCUMENTS 3,904,969 A * 9/1975 Eastmond ............. 455/221
4,480,335 A * 10/1984 Kishi .................. 455/212
5,036,543 A * 7/1991 Ueno .................. 381/13

FOREIGN PATENT DOCUMENTS

JP    2001-332992    11/2001
JP    2007-189546    7/2007

\* cited by examiner

*Primary Examiner* — Lee Nguyen
(74) *Attorney, Agent, or Firm* — Renner, Kenner, Greive, Bobak, Taylor & Weber

(57) ABSTRACT

In a radio receiving apparatus, an analog received signal is converted into a digital received signal. An unwanted wave in an adjacent channel band is rejected, that is adjacent to a passband for the digital received signal. The digital received signal with no unwanted wave is converted into a first demodulated signal. The first demodulated signal is converted into a second demodulated signal in analog form. A noise component is extracted from the first demodulated signal. The second demodulated signal is suppressed under squelch control when a squelch voltage that is a voltage of the noise component after rectification and smoothing becomes equal to or higher than a predetermined threshold level.

7 Claims, 4 Drawing Sheets

RADIO RECEIVING APPARATUS

CROSS-REFERENCE TO RELATED APPLICATIONS

This application is based on and claims the benefit of priority from the prior Japanese Patent Application No. 2009-291157 filed on Dec. 22, 2009, the entire contents of which is incorporated herein by reference.

BACKGROUND OF THE INVENTION

The present invention relates to a radio receiving apparatus that can suppress the output of detected signals in accordance with the amount of noise components.

In a known FM (Frequency Modulation) radio receiving apparatus, an IF (Intermediate Frequency) signal and then a baseband signal are extracted from an RF (Radio Frequency) signal received at an antenna. The baseband signal is supplied to a detector to be a demodulated signal that is then output through a speaker. Not only the demodulated signal, noise is given off from the speaker, based on a unwanted low-level radio wave when an RF signal to be processed is not received.

To solve such a problem of noises, in another known FM radio receiving apparatus, noise components are only extracted from a demodulated signal, that are then rectified and smoothed to produce a squelch signal. The output of the demodulated signal to a speaker is cut whenever the voltage level of the squelch signal reaches a predetermined threshold level (squelch control.) A demodulated signal is output to the speaker whenever an RF signal to be processed is received under the squelch control.

The latter known FM radio receiving apparatus is configured with analog circuitry. A received signal thus can be amplified to be distorted before the detection by a discriminator. There is also small leakage noise from an analog filter even in bands other than the passband. It is thus easy to detect noise components from a demodulated signal, so that the squelch control is successfully performed.

Recent FM radio receiving apparatuses are, however, configured with digital circuitry in order to meet the demands for narrower occupied bandwidth, higher speech quality, and higher speech secrecy. In such digital FM radio receiving apparatuses, the following are advanced: narrower occupied bandwidth in analog frequency modulation; and further narrower occupied bandwidth by digital modulation with 4-level FSK (Frequency Shift Keying.) In detection, in place of a discriminator suitable for analog modulation, the arctangent function is employed that applies inverse orthogonal transform to the value obtained by adding angular displacement corresponding to a modulated signal to the former value, through the tangent function.

With the arctangent function, however, a received signal cannot be saturated due to digital processing with A/D conversion. Thus, with the arctangent function, it is impossible to perform detection, such as a discriminator, to a signal saturated by a limiter to have a limited amplitude. Therefore, it is difficult to obtain noise enough for squelch control, with the arctangent function.

Moreover, narrower occupied bandwidth makes it difficult for an analog filter to achieve steep characteristics for adjacent channel rejection. Adjacent channel rejection (referred to as ACR, hereinafter) in bands other than the passband can be achieved with a digital filter that exhibits the characteristics with a steep attenuation curve.

However, an ACR filter, for example, inevitably suppresses leakage noise that would otherwise be detected due to poor ACR performance of an analog filter if used and also cannot saturate a received signal with a limiter. With the ACR filter, it is thus difficult to detect noise components of a demodulated signal, resulting in poor performance of squelch control. Thus, users are forced to listen to unwanted noise.

Accordingly, in known radio receiving apparatuses installed with a digital modulation mode, digital saturation processing is performed to very small noise components demodulated by a detector. In the digital saturation processing, for example, a noise level is replaced with a predetermined upper limit value if it reaches a predetermined threshold level, as if the noise components were amplified.

Such digital saturation processing allows the detection of noise components, however, irregular harmonics inevitably appear because the processing is nonlinear. Squelch control functions normally if the level of the irregular harmonics is lower than a predetermined threshold level that is used for determination in squelch control. However, squelch control functions more than necessary if the level of the irregular harmonics reaches the threshold level.

It is thus desirable for squelch control to detect noise components while avoiding irregular harmonics. However, it is impossible to set a frequency band for detecting noise components if the frequency at which irregular harmonics appear is not constant. The frequency band for noise detection is limited to a narrow band, even if it can be set, which can avoid the appearance of irregular harmonics.

Thus, when irregular harmonics appear in a frequency band for noise detection, with the levels reaching the threshold level, discussed above, the irregular harmonics are detected as a squelch voltage used for squelch control. The squelch control thus inevitably functions to block the output of a demodulated signal that should not be blocked.

SUMMARY OF THE INVENTION

A purpose of the present invention is to provide a radio receiving apparatus with a highly stable and accurate squelch control function to accurately detect noise components while avoiding irregular harmonics, with no nonlinear amplification of a demodulated signal under digital modulation.

The present invention provides a radio receiving apparatus comprising: an analog-to-digital converter configured to convert an analog received signal into a digital received signal; an adjacent channel rejection filter configured to reject an unwanted wave in an adjacent channel band that is adjacent to a passband for the digital received signal; a detector configured to detect the digital received signal for which the unwanted wave in the adjacent channel band is rejected, thus generating a first demodulated signal; a digital-to-analog converter configured to convert the first demodulated signal into a second demodulated signal in analog form; a noise bandpass filter configured to extract a noise component from the first demodulated signal; and a squelch controller configured to suppress the second demodulated signal when a squelch voltage that is a voltage of the noise component after rectification and smoothing becomes equal to or higher than a predetermined first threshold level.

DETAILED DESCRIPTION OF PREFERRED EMBODIMENT

A preferred embodiment according to the present invention will be disclosed with reference to the drawings attached herewith.

Figure 1:
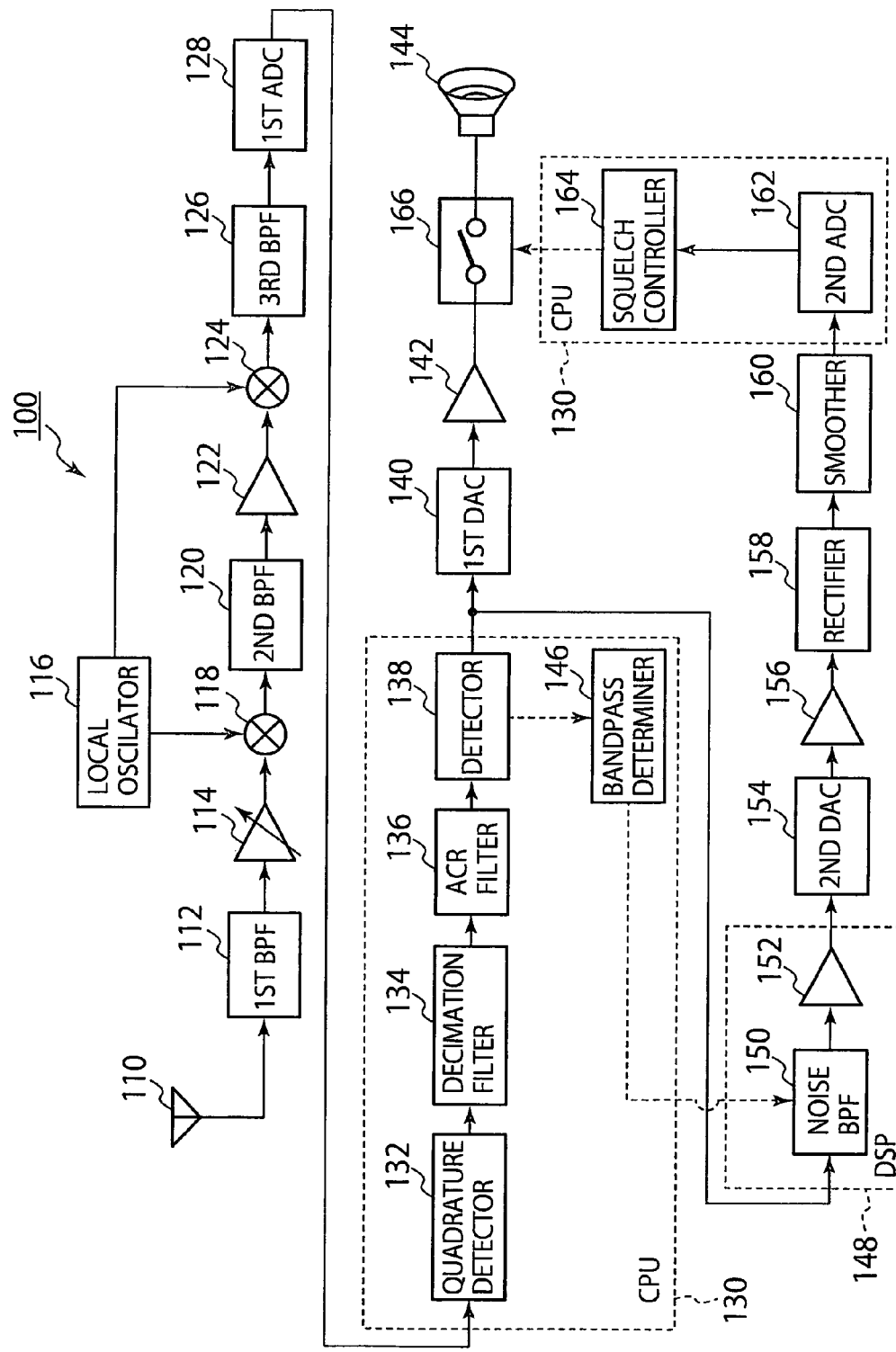
FIG. 1 shows a block diagram of a preferred embodiment of a radio receiving apparatus according to the present invention.

A radio receiving apparatus 100 shown in FIG. 1, a preferred embodiment according to the present invention, is installed with a squelch control function to extract noise components only from a demodulated signal and block the output of the demodulated signal to a speaker in accordance with the extracted noise components.

The squelch control function solves the following problem caused in known FM radio receiving apparatuses: When no RF signal to be processed is received, an S/N ratio varies to cause large noise based on unwanted waves with a low signal level. The large noise is then output via a speaker, in addition to a processed RF signal. A user is forced to listen to the unwanted noise whenever no RF signal to be processed is received.

In the radio receiving apparatus 100, the squelch control function is performed highly stably and accurately by detecting noise components while avoiding irregular harmonics, with no nonlinear amplification of a demodulated signal under digital modulation.

FIG. 1 is a block diagram of the radio receiving apparatus 100 that is a preferred embodiment according to the present invention.

In FIG. 1, the radio receiving apparatus 100 is provided with an antenna 110, a first BPF (BandPass Filter) 112, an AGC (Automatic Gain Control) amplifier 114, a local oscillator 116, a first mixer 118, a second BPF 120, an IF amplifier 122, a second mixer 124, a third BPF 126, a first ADC (Analog to Digital Converter) 128, a quadrature detector 132, a decimation filter 134, an ACR (Adjacent Channel Rejection) filter 136, a detector 138, a first DAC (Digital to Analog Converter) 140, an output amplifier 142, an audio output unit 144, a passband determiner 146, a noise BPF 150, a squelch amplifier 152, a second DAC 154, a noise amplifier 156, a rectifier 158, a smoother 160, a second ADC 162, a squelch controller 164, and a switch 166.

The quadrature detector 132, the decimation filter 134, the ACR filter 136, the detector 138, and the passband determiner 146 are installed in a CPU (Central Processing Unit) 130. The second ADC 162 and the squelch controller 164 are also installed in the CPU 130. The noise BPF 150 and the squelch amplifier 152 are installed in a DSP (Digital Signal Processor) 148.

A radio wave signal of an FM broadcasting wave, radio communications, etc. is received at the antenna 100. The radio wave signal is supplied to the first BPF 112. An RF signal in a desired frequency band is only extracted from the radio wave signal by the first BPF 112. The RF signal is supplied to the AGC amplifier 114 to undergo gain adjustments to have a constant signal level.

The RF signal having a constant signal level is supplied to the first mixer 118. Also supplied to the first mixer 118 is a signal of a first local oscillator frequency from the local oscillator 116. The first mixer 118 mixes the RF signal and the signal of the first local oscillator frequency to generate an added signal component and a subtracted signal component. The added and subtracted signal components are supplied to the second BPF 120 and the subtracted signal component is only extracted as an IF signal.

The IF signal is amplified by the IF amplifier 122 and then supplied to the second mixer 124. Also supplied to the second mixer 124 is a signal of a second local oscillator frequency from the local oscillator 116. The second mixer 124 mixes the IF signal and the signal of the second local oscillator frequency to generate an added signal component and a subtracted signal component. The added and subtracted signal components are supplied to the third BPF 126 and the subtracted signal component is only extracted as a target analog received signal.

The analog received signal is supplied to the first ADC 128 and converted into a digital received signal. The digital received signal is then supplied to the quadrature detector 132 and converted into a baseband signal. The baseband signal is further supplied to the decimation filter 134 to be a digital baseband signal at a sampling frequency of, for instance, 96 KHz.

The digital baseband signal is supplied to the ACR filter 136 by which unwanted waves of adjacent channels are rejected. The digital baseband signal with no unwanted waves of adjacent channels is then supplied to the detector 138 having the arctangent function, thus being a demodulated signal.

The ACR filter 136 is configured with a digital filter to exhibit the characteristics of a steep attenuation curve that drastically improves the rejection of unwanted waves of adjacent channels. Employed as the ACR filter 136 in this embodiment is not a low pass filter (LPF) but a band elimination filter (BEF), which will be described later.

The arctangent function installed in the detector 138 is used in FM detection is such a manner as follows: The digital received signal output from the first ADC 128 is converted into quadrature components by the quadrature detector 132. The quadrature components are supplied to the detector 138 via the decimation filter 134 and the ACR filter 136, thus undergoing sampling at the same timing to obtain sampled amplitude levels. The arctangent function is then applied to the sampled amplitude levels to obtain phase angles and add (integration) the angular change per sampling to the phase angle obtained just previously, thus producing a demodulated signal that corresponds to a modulated signal.

The arctangent function is used in FM detection, in this embodiment. Not only that, however, the arctangent function can be used in the detection of signals modulated by a variety of types of digital modulation, such as PSK (Phase Shift Keying), for example, BPSK (Binary Phase Shift Keying), QPSK (Quadrature PSK) and 4-value FSK.

The demodulated signal of the detector 138 is supplied to the first DAC and converted into an analog signal. The analog signal is supplied to the output amplifier 142 and then output to the audio output unit 144 such as a speaker or headphones so that a user can listen to the demodulated signal.

The demodulated signal of the detector 138 is also supplied to the passband determiner 146. The passband determiner 146 is equipped with an FFT (Fast Fourier Transform) analyzer or the like to perform frequency analysis of the demodulated signal. The frequency analysis is performed to: estimate harmonics that would appear in a frequency band including the audible upper limit frequency (15 KHz, for instance) or higher of the demodulated signal output from the detector 138; search for a frequency band (a frequency band for noise detection) that is not prone to the effects of blocking by harmonics, thus avoiding the harmonics; and then determine the passband of the noise BPF 150. The passband may be specified by the center frequency and the bandwidth. A detailed operation of the passband determiner 146 will be described later.

The demodulated signal of the detector 138 is supplied to the noise BPF 150 via the passband determiner 146. The noise BPF 150 extracts noise components from the demodulated signal within the passband decided by the passband determiner 146.

The noise components extracted by the noise BPF 150 are supplied to the squelch amplifier 152 for amplification. The amplified noise components is supplied to the second DAC 154 and converted into an analog signal. The analog signal of noise components is supplied to the noise amplifier 156 for amplification. The amplified analog signal of noise components is supplied to the rectifier for rectification. The rectified signal of noise components is supplied to the smoother 160 for smoothing. The voltage of the smoothed signal of noise components is a squelch voltage to be used for squelch control. The smoothed signal of noise components is then supplied to the second ADC 162 and converted into a digital signal having the squelch voltage.

The digital signal having the squelch voltage is supplied to the squelch controller 164 that performs squelch control, as described below.

The squelch voltage is compared with a first predetermined reference threshold level and also a second predetermined reference threshold level that is lower than the first threshold level.

When the squelch voltage is equal to or higher than the first threshold level, the squelch controller 164 determines that no RF signal to be processed is received at the radio receiving apparatus 100. Then, the squelch controller 164 turns off the switch 166 to cut off the demodulated signal output from the output amplifier 142 so that a user is not forced to listen to unwanted noise.

The squelch controller 164 in this embodiment has the following hysteresis characteristics. Once turning off the switch 166, the squelch controller 164 does not turn on the switch 166 even when the squelch voltage becomes lower than the first threshold level but higher than the second threshold level. The squelch controller 164 turns on the switch 166 when the squelch voltage becomes equal to or lower than the second threshold level.

The hysteresis characteristics described above achieves stable squelch control by preventing the chattering of the switch 166 even if the squelch voltage fluctuates in the vicinity of the first threshold level.

As described above, the passband determiner 146 determines the passband of the noise BPF 150 in order to avoid harmonics that would appear in a frequency band including the audible upper limit frequency or higher of the demodulated signal of the detector 138.

The harmonics that would appear in a frequency band to be subjected to squelch control and including the audible upper limit frequency or higher of the demodulated signal mainly include: (1) harmonics of an original signal (a signal component to be processed in an audible frequency band); (2) harmonics based on the characteristics of hardware of the radio receiving apparatus 100; and (3) harmonics based on nonlinear processing in detection.

Figure 2:
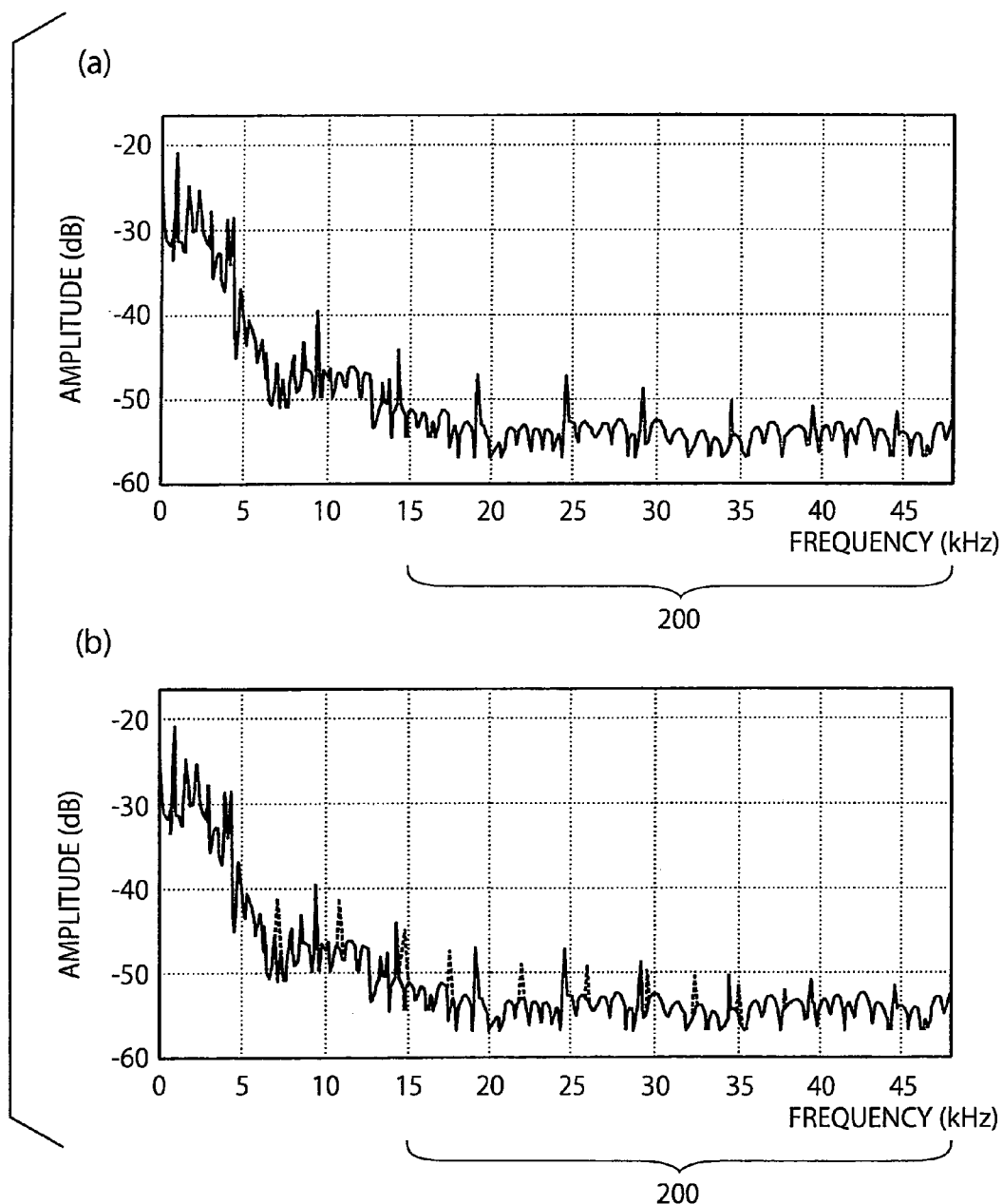
FIG. 2 is a view illustrating harmonics that would appear in a frequency band higher than an audible upper limit frequency.

FIG. 2 is a view illustrating harmonics that would appear in a frequency band 200 higher than an audible upper limit frequency.

For the harmonics (1) and (2) listed above, the frequency at which the harmonics appear and the degree of appearance (amplitude) can be determined when the original signal is known or the specification of hardware is decided, as shown in (a) of FIG. 2. Thus, the passband determiner 146 can predict the harmonics (1) and (2) from the demodulated signal.

In contrast, the harmonics (3) based on nonlinear processing in detection appear irregularly, as indicated by a broken line in (b) of FIG. 2. The harmonics (3) is caused by folding of a received signal that is distorted before the detection procedure under digital modulation with the arctangent function, employed in place of a discriminator. The saturation procedure after detection also cause harmonics to appear irregularly in the frequency band 200 higher than an audible upper limit frequency. It is not easy to predict the frequency at which the harmonics (3) appear irregularly, resulting extremely lower prediction accuracy than for the harmonics (1) and (2).

Squelch control requires a high squelch performance to accurately detect the change in noise components when no RF signal to be processed is received and stably turn on and off the switch 166 without chattering in response to the change in the RF signal.

Moreover, squelch control requires a high blocking performance to block harmonics so that the harmonics cannot affect the switching operation of the switch 166. The blocking of harmonics has to be performed even if harmonics appear in a frequency band (to be subjected to squelch control) equal to or higher than an audible upper limit frequency when, for example, a signal (including an audible signal) in a frequency band up to 3 KHz passes through each component of the radio receiving apparatus 100.

In order to achieve both of the squelch and blocking performances, it is preferable to distinguish harmonics and noise components and detect the noise components only while avoiding the harmonics. This is because when harmonics having a certain voltage level appear in a frequency band subjected to squelch control and set for detection of noise components, the voltage level of the harmonics could be determined as a squelch voltage equal to or higher than a threshold level. This results in that the output of a demodulated signal is inevitably blocked.

However, it is almost impossible to accurately set a frequency band for detection of noise components due to irregular appearance of harmonics (3) based on nonlinear processing in detection. And, even if such a frequency band can be set, it is limited to a narrow band that can avoid the appearance of harmonics.

Accordingly, in this embodiment, not an LPF but a BEF is used as the ACR filter 136 installed before detection. With a BEF function, the ACR filter 136 rejects the frequency bands corresponding to the adjacent channels whereas allows the frequency bands apart from the adjacent channel band to pass through. The ACR filter 136 can be configured with a BEF that is a known digital filter, such as, a finite impulse resonance filter and an infinite impulse resonance filter.

The frequency bands to be rejected by the ACR filter 136 are discussed with reference to FIGS. 3 and 4.

Recent higher frequency utilization efficiency in radio communications accelerates usage of narrower frequency bands, with narrower channel spacing from 25 KHz to 12.5 KHz, especially to 6.25 KHz in 4-value FSK digital systems. A ceramic filter or the like can reject adjacent channels for the 12.5-KHz frequency band. However, the ceramic filter cannot exhibit steep characteristics at the cut-off frequency for the 6.25-KHz frequency band. Thus, a digital filter is used as an ACR filter for such a narrower frequency band of 6.25 KHz.

In this embodiment shown in FIG. 1, a digital received signal via the first ADC 128 is converted into a bassband signal by the quadrature detector 132. The ACR filter 136 thus can be basically configured with an LPF.

Figure 3:
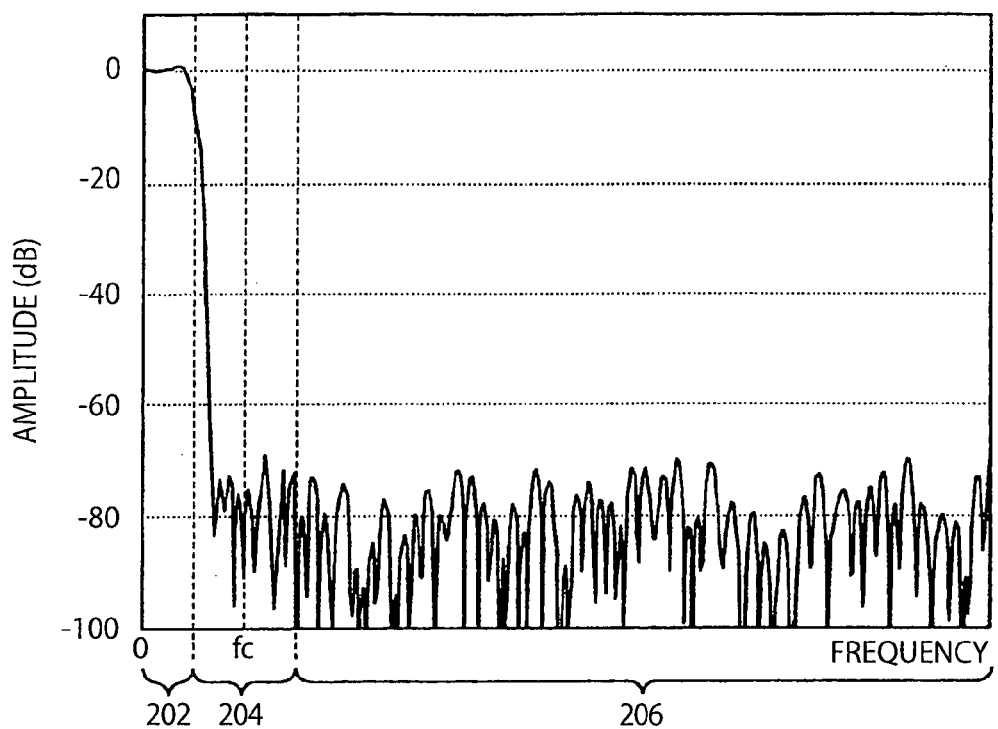
FIG. 3 is a view illustrating frequency bands to be rejected by a known ACR (Adjacent Channel Rejection) filter.

As shown in FIG. 3, a known ACR filter (LPF) allows to pass therethrough a frequency band 202 that is ½ of a channel bandwidth of digital received signals. On the other hand, the known ACR filter rejects an unnecessary adjacent channel band 204 having an adjacent channel center frequency fc and also an unnecessary frequency band 206 far from the frequency band 202.

In use of a known FM detector, a signal to be demodulated is saturated by a limiter before detection. Thus, an enough amount of noise can be obtained for well performance of squelch control after detection, even when no signal to be processed is received.

On the contrary, in use of a detector (such as, the detector 138 shown in FIG. 1) for detecting a digital baseband signal in a narrow frequency band, the signal cannot be saturated before detection. Thus, the amount of noise after detection is extremely smaller than that obtained by the known FM detector after saturation by a limiter. Such a small amount of noise requires to be saturated and distorted for obtaining noise components necessary for squelch control. It is thus difficult to achieve stable squelch control in response to actual change in noise amount of radio signals.

Accordingly, in this embodiment, the ACR filter 136 (FIG. 1) is configured with a BEF to constantly reject the adjacent channel band 204, like an LPF, whereas allow the frequency band 206 higher than the band 204 to pass therethrough.

Theoretically, an FM detector outputs demodulated signals of a larger level for received signals of a wider frequency band. A wider frequency band to be subjected to FM detection, therefore, gives a larger amount of noise after the detection for squelch control, with no saturation of noise components required, thus achieving stable squelch control in response to actual change in noise amount.

Figure 4:
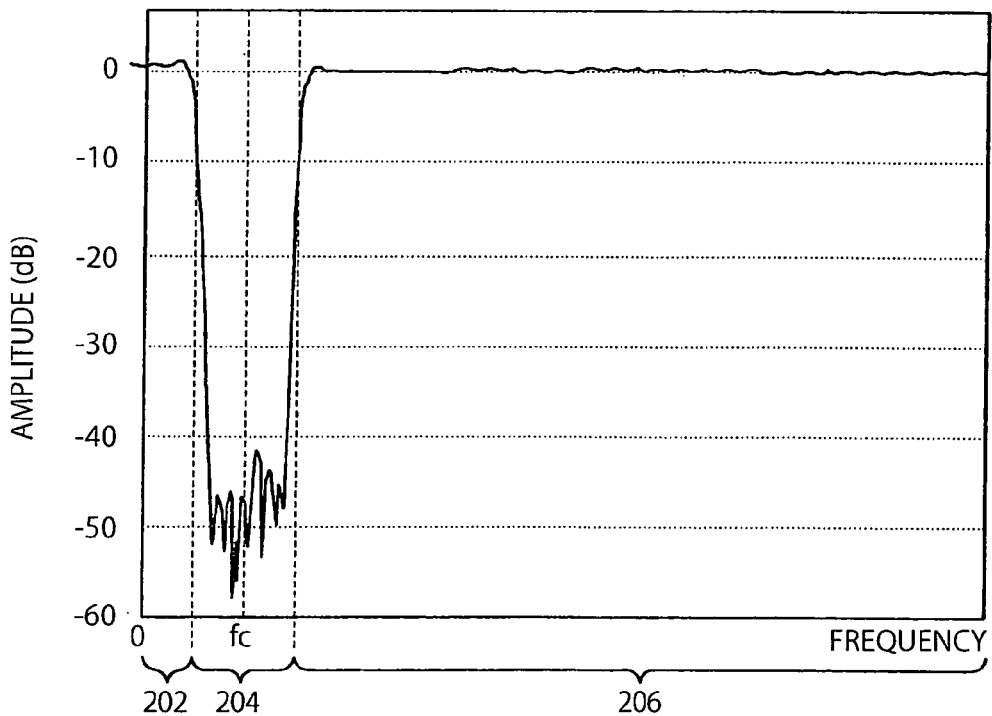
FIG. 4 is a view illustrating frequency bands to be rejected by an ACR filter according to the present invention.

The frequency band 202 that is ½ of a channel bandwidth of digital received signals and the adjacent channel band 204 having an adjacent channel center frequency fc, shown in FIGS. 3 and 4, can be adjusted as desired. For example, the bands 202 and 204 can be set to: a band up to 3.125 KHz and a band from 3.125 KHz to 9.375 KHz (with 6.25 KHz in adjacent channel center frequency fc), respectively, for channel spacing of 6.25 KHz; or a band up to 6.25 KHz and a band from 6.25 KHz to 18.75 KHz (with 12.5 KHz in adjacent channel center frequency fc), respectively, for channel spacing of 12.5 KHz.

Moreover, the adjacent-channel rejection bandwidth of the ACR filter 136 (BEF) of this embodiment can be adjusted in accordance with the effects of adjacent-channel waves.

As described above, the ACR filter 136 (BEF) of this embodiment can detect an enough amount of noise for squelch control. Thus, the noise BPF 150 installed in the later stage as shown in FIG. 1 does not need such a conventional noise-component saturation procedure. Nevertheless, the gain of noise components is adjusted by the following squelch amplifier 152 within a linear range for adjustments to the absolute amount of noise components within the maximum input range of the second DAC 154.

Accordingly, with the ACR filter 136 configured with a BEF, linear digital processing can be achieved at the CPU 130 and the DSP 148, that corresponds to an analog linear processing so that harmonics appear regularly that would otherwise appear irregularly.

Therefore, high reproducibility is achieved for the harmonics (3) based on nonlinear processing in detection, in addition to the harmonics (1) of an original signal (a demodulated signal component in an audible frequency band) and the harmonics (2) based on the characteristics of hardware of the radio receiving apparatus 100. And, hence it is easy for the passband determiner 146 having an FFT analyzer to perform frequency analysis concerning the location of appearance of harmonics and the degree of appearance (amplitude).

As described above, the passband determiner 146 can easily determine the frequency band for detecting noise components that are to be subjected to squelch control while avoiding the effects of harmonics. And, hence the noise BPF 150 sets a passband to the frequency band determined by the passband determiner 146 so that it can stably extract noise components without harmonics. The stable extraction of noise components offers stable squelch control to stably turn on and off the switch 166 in response to whether there is an RF signal to be processed.

Squelch control has to meet the three requirements of blocking performance, attack time, and squelch voltage curve and tight points.

The blocking performance shows how to stably block harmonics, as already discussed. The attack time is a response time from the moment at which no RF signal to be processed is received to the moment at which the switch 166 is turned off (the squelch control functions), with delay in processing at the rectifier 158 and the smoother 160, etc. The squelch voltage curve and tight points are related to the hysteresis characteristics of squelch control already discussed concerning the turning-on and -off of the switch 166.

Figure 5:
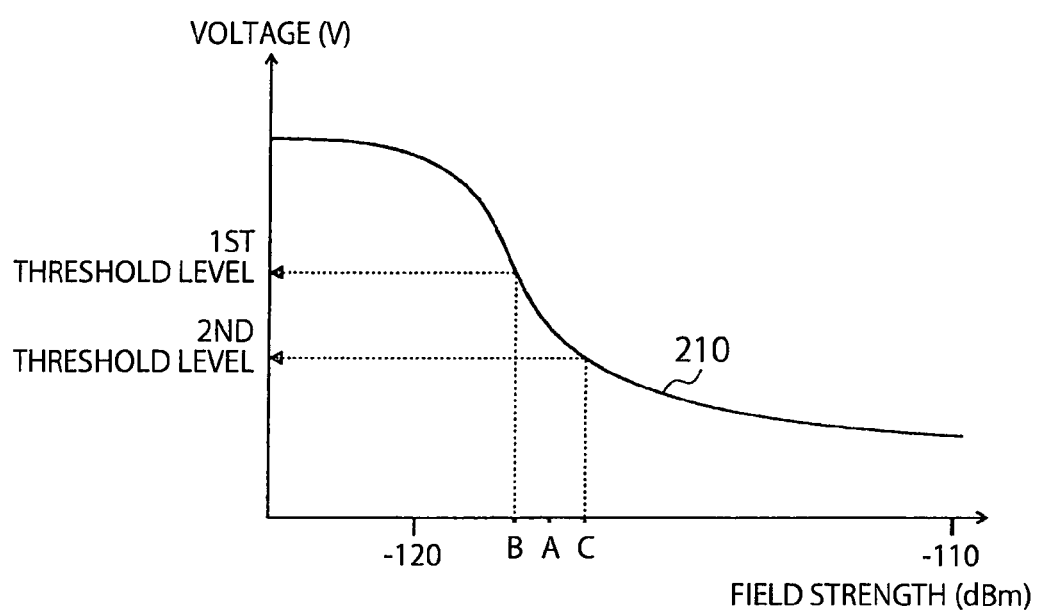
FIG. 5 is a view illustrating a squelch voltage curve and tight points for squelch control.

FIG. 5 illustrates the squelch voltage curve and tight points, showing a squelch voltage curve 210 with squelch voltage on the ordinate versus field strength at the antenna 110 (FIG. 1) on the abscissa, varying from −120 dBm to −110 dBm.

When the field strength at the antenna 110 is at a point A, field strengths larger and smaller than this field strength by a certain level are uniquely determined at points B and C, respectively. The voltages on the squelch voltage curve 210 and corresponding to the field strengths at the points B and C are tight points, or the first and second threshold levels.

As understood from FIG. 5, the first and second threshold levels have a larger difference on a steeper portion of the squelch voltage curve 210, causing slower response of the hysteresis characteristics of squelch control. In contrast, the first and second threshold levels have a smaller difference on a gentler portion of the curve 210, causing quicker response of the hysteresis characteristics.

The three parameters of squelch control: blocking performance, attack time, and squelch voltage curve and tight points have the trade-off thereamong.

It is thus required to select a frequency band for noise detection at the passband determiner 146 under consideration of all of the above three parameters of squelch control.

In this embodiment, however, the location of appearance of harmonics is comparatively accurately estimated, which would otherwise requires a wider frequency band for the estimation of harmonics if the location of appearance is irregular. It is thus possible for the passband determiner 146 in this embodiment to set a wider frequency band for detection of noise components under consideration of all of the above three parameters of squelch control.

Moreover, it is conventionally required to often change the frequency band for detection of noise components due to irregular location of appearance of harmonics.

In contrast, it is not required for the present embodiment to often change the frequency band for detection of noise components because of accurate estimation of the location of appearance of harmonics. The present embodiment thus has much less need of change in the filter coefficients and the number of taps of the noise BPF 150.

Accordingly, the present embodiment with accurate detection of noise components with no effects of harmonics achieves highly stable and accurate squelch control to cut off large noises with no degradation of received signals to be output.

Moreover, as shown in FIG. 4, the ACR filter 136 configured with a digital filter in the CPU 130 rejects the adjacent channel band 204 with the characteristics of a steep attenuation curve and a highly accurately set cut-off frequency, whereas allows the band 206 higher than the band 204 and far from the band 202 to pass therethrough. This function of the ACR filter 136 allows the detection of noise components of high level for stable squelch control.

In FIG. 1, when an unwanted wave is received at a frequency in the frequency band 206 higher than the adjacent channel band 204, it is rejected by the second and third BPFs 120 and 126. There is thus no problem for the ACR filter 136 to pass the frequency band 206 therethrough.

Moreover, the configuration of the ACR filter 136 and the noise BPF 150 with a digital filter allows easy adjustments to the filter coefficients, tap numbers, gain, inclination of the cur-off portion of the attenuation curve, etc. of these filters. This further allows experiments, evaluation, tuning, etc., with no modification to the hardware of the radio receiving apparatus 100, thus achieving the reduction in cost for development, production and maintenance, etc.

As described above in detail, the radio receiving apparatus 100 with a digital modulation system of, for example, the arctangent function, performs accurate diction of noise components while avoiding the effects of harmonics. The accurate diction of noise components achieves stable and accurate squelch control with high squelch and blocking performances.

Further advancement in digitization of the radio receiving apparatus 100 has the possibility of reduction in space occupancy of circuitry and power consumption.

For example, the rectifier 158 and the smoother 160, etc. configured with analog circuitry in FIG. 1 can be configured with digital circuitry. The digital circuitry does not require digital-to-analog conversion at the second DAC 154, which leads to the reduction in space occupancy of circuitry and power consumption.

It is further understood by those skilled in the art that the foregoing description is a preferred embodiment of the disclosed apparatus and that various changes and modifications may be made in the invention without departing from the spirit of and scope thereof.

For instance, the present is applicable to a radio receiving apparatus in which the output of demodulated signals is suppressed in accordance with the amount of noise components.

As described in detail, the present invention achieves a highly stable and accurate squelch control function to accurately detect noise components while avoiding irregular harmonics, with no nonlinear amplification of a demodulated signal under digital modulation in a radio receiving apparatus.

What is claimed is:

1. A radio receiving apparatus comprising:
   an analog-to-digital converter configured to convert an analog received signal into a digital received signal;
   an adjacent channel rejection filter configured to reject an unwanted wave in an adjacent channel band that is adjacent to a passband for the digital received signal;
   a detector configured to detect the digital received signal for which the unwanted wave in the adjacent channel band is rejected, thus generating a first demodulated signal;
   a digital-to-analog converter configured to convert the first demodulated signal into a second demodulated signal in analog form;
   a noise bandpass filter to extract a noise component from the first demodulated signal; and
   a squelch controller configured to suppress the second demodulated signal when a squelch voltage that is a voltage of the noise component after rectification and smoothing becomes equal to or higher than a predetermined first threshold level.

2. The radio receiving apparatus according to claim 1 further comprising a passband determiner configured to determine a passband of the noise bandpass filter so as to avoid harmonics that appear in a frequency band including an audible upper limit frequency or higher of the first demodulated signal.

3. The radio receiving apparatus according to claim 1, wherein the detector detects the digital received signal by using an arctangent function.

4. The radio receiving apparatus according to claim 1, wherein the adjacent channel rejection filter passes a wave in a frequency band higher than the passband, the adjacent channel band being located between the passband and the frequency band.

5. The radio receiving apparatus according to claim 1 further comprising a switch via which the second demodulated signal is output.

6. The radio receiving apparatus according to claim 5, wherein the squelch controller turns off the switch to block the output of the second demodulated signal when the squelch voltage becomes equal to or higher than the first threshold level.

7. The radio receiving apparatus according to claim 6, wherein the squelch controller continuously turns off the switch even when the squelch voltage becomes lower than the first threshold level but higher than a second threshold level that is lower than the first threshold level whereas turns on the switch to output the second demodulated signal when the squelch voltage becomes equal to or lower than the second threshold level.

* * * * *